United States Patent
Lee et al.

(10) Patent No.: US 11,341,500 B2
(45) Date of Patent: May 24, 2022

(54) INAUDIBLE VOICE PAYMENT

(71) Applicant: Mastercard International Incorporated, Purchase, NY (US)

(72) Inventors: Charles Sangwon Lee, Briarcliff Manor, NY (US); Thomas Veraart, Manhasset, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 11 days.

(21) Appl. No.: 16/818,293

(22) Filed: Mar. 13, 2020

(65) Prior Publication Data
US 2021/0287223 A1 Sep. 16, 2021

(51) Int. Cl.
*G06Q 20/40* (2012.01)
*G06Q 20/38* (2012.01)

(52) U.S. Cl.
CPC ... *G06Q 20/40145* (2013.01); *G06Q 20/3829* (2013.01)

(58) Field of Classification Search
None
See application file for complete search history.

(56) References Cited

U.S. PATENT DOCUMENTS

2019/0279181 A1\* 9/2019 Kelly .................. G06Q 20/202
2020/0097965 A1\* 3/2020 Castoro ............... G06Q 20/401

\* cited by examiner

*Primary Examiner* — Namrata Boveja
*Assistant Examiner* — Amit Patel
(74) *Attorney, Agent, or Firm* — Ohlandt, Greeley, Ruggiero & Perle, LLP

(57) ABSTRACT

A method and a system are provided for secure payment card transactions using a voice enabled device. The user device encodes a tokenized payment card transaction into an inaudible soundwave and emits the soundwave via a speaker to the voice enabled device. The voice enabled device, while in a listening state, detects the inaudible soundwave via a microphone. The voice enabled device decrypts the inaudible soundwave and transmits the decrypted tokenized payment for downstream processing by the payment card system.

8 Claims, 11 Drawing Sheets

INAUDIBLE VOICE PAYMENT

BACKGROUND OF THE DISCLOSURE

1. Field of the Disclosure

The present disclosure relates to a method and a system for a payment card system and payment card system transaction processing.

2. Description of the Related Art

Consumers are using voice assistants and voice enabled devices as a smarter, faster, and easier way to perform everyday activities. Examples of voice assistants include Apple's Siri, Samsung's Bixby, and standalone voice enabled devices, such as smart speakers like Amazon Alexa Echo, Microsoft Cortana, Google Home, and so on. For more serious situations involving money and payment card transactions consumers are hesitant to trust voice enabled devices. For example, During February 2018, PwC surveyed a nationally representative sample of 1,000 Americans between the ages of 18-64. Only 10% of surveyed respondents were not familiar with voice-enabled products and devices. Of the 90% who were, the majority had used a voice assistant (72%). The survey found consumers are hesitant to allow voice enabled devices and voice assistants perform more advanced activities like shopping or controlling other smart devices in the home. Consumers expressed a fear that that when dealing with more sensitive information, like credit card numbers or payments, anybody could get on and access the information. Accordingly, there is need for more secure communications, user authentication, and financial transactions involving voice enabled devices.

SUMMARY OF THE DISCLOSURE

In view of the foregoing, described are systems and methods that provide a technological platform to allow payment card holders to make secure user authentication payments using a voice enabled device.

In an embodiment, described is a method for voice enabled payment processing, the method comprising:
outputting a request for payment information from a voice enabled device;
placing the voice enabled device into a listening state;
transmitting a page showing payment details to the user device via an inaudible soundwave from the voice enabled device;
obtaining the payment information from a payment application on the user device;
tokenizing the payment information with a token at the user device;
converting the tokenized payment information to an inaudible soundwave including the tokenized payment information at the user device;
encrypting the inaudible soundwave including the tokenized payment information at the user device;
emitting, via a speaker of the user device, the encrypted inaudible soundwave including the tokenized payment information to the voice enabled device for downstream payment processing by a payment processing system;
decrypting the encrypted inaudible soundwave;
detokenizing the tokenized payment information; and
processing the payment information at the payment processing system for a payment transaction. The method can further comprise accepting an input at the user device for authenticating the identity of the user.

In an embodiment, the method can further comprise: decrypting the encrypted inaudible soundwave including the tokenized payment information at the voice enabled device; transmitting the decrypted tokenized payment information from the voice enabled device to the virtual assistant server; and detokenizing the tokenized payment information at the payment processing system.

In an embodiment, the method can further comprise: converting the encrypted inaudible soundwave including the tokenized payment to an encrypted data payload including the tokenized payment information at the voice enabled device; transmitting the encrypted data payload including the tokenized payment information from the voice enabled device to the virtual assistant server; decrypting the encrypted data payload including the tokenized payment information at the virtual assistant server; and detokenizing the tokenized payment information at the payment processing system.

In an embodiment, the method can further comprise: converting the encrypted inaudible soundwave including the tokenized payment to an encrypted data payload including the tokenized payment information at the voice enabled device; transmitting the encrypted data payload including the tokenized payment information from the voice enabled device to the virtual assistant server; transmitting the encrypted data payload with the tokenized payment information from the virtual assistant server to a merchant server; decrypting the encrypted data payload including the tokenized payment information at the merchant server; and detokenizing the tokenized payment information at the payment processing system.

In an embodiment, the method can further comprise: converting the encrypted inaudible soundwave including the tokenized payment to an encrypted data payload with the tokenized payment information at the voice enabled device; transmitting the encrypted data payload including the tokenized payment information from the voice enabled device to the virtual assistant server; transmitting the data payload including the tokenized payment information from the virtual assistant server to a merchant server; transmitting the encrypted data payload including the tokenized payment information from the merchant server to the payment processing system; decrypting the data payload in the tokenized payment information at the payment processing system; and detokenizing the tokenized payment information at the payment processing system.

In an embodiment, the method can further comprise transmitting the decrypted and detokenized payment information from a payment card network server of the payment processing system to an issuer server of the payment processing system. The method can also further comprise transmitting a confirmation of the processed payment transaction from the payment processing system to the virtual assistant server; transmitting the confirmation from the virtual assistant server to the voice enabled device; and transmitting a confirmation to the user from the voice enabled device.

In an embodiment, the method can further comprise: converting the encrypted inaudible soundwave including the tokenized payment to an encrypted data payload including the tokenized payment information at the voice enabled device; transmitting the encrypted data payload including the tokenized payment information from the virtual assistant server to a merchant server; decrypting the encrypted data payload including the tokenized payment information at a payment card network server of the payment processing system; transmitting the decrypted tokenized payment information from the payment card network server to an issuer server of the payment processing system; and detokenizing the tokenized payment information at an issuer server.

In an embodiment, the method can further comprise: encrypting a confirmation payload including an inaudible soundwave at either a virtual assistant server or the voice enabled device; emitting the encrypted inaudible soundwave via a speaker to the user device from the voice enabled device; and decrypting the encrypted soundwave confirmation at the user device.

In an embodiment, described is a system comprising: a payment card processing system comprising a processor for processing a payment card transaction; and a voice enabled device comprising a processor and operatively connected to a voice assistant server; the voice enabled device being configured to at least:

output a request for payment information;

enter a listening state;

transmit a page showing payment details to the user device via an inaudible soundwave from the voice enabled device;

detect and obtain, via a microphone, an encrypted inaudible soundwave including a tokenized payment information emitted from a speaker of the user device;

decrypt the encrypted inaudible soundwave including the tokenized payment or convert the encrypted inaudible soundwave including the tokenized payment to an encrypted data payload including the tokenized payment information; and the payment card processing system being configured to at least:

detokenize the tokenized payment information; and process the payment information at the payment processing system for a payment transaction.

In an embodiment, the voice enabled device can be configured to: convert the encrypted inaudible soundwave including the tokenized payment to an encrypted data payload including the tokenized payment information; and transmit the encrypted data payload including the tokenized payment information from the voice enabled device to a virtual assistant server. The virtual assistant server can be configured to decrypt the encrypted data payload including the tokenized payment information at the virtual assistant server.

In an embodiment, the voice enabled device can be configured to: convert the encrypted inaudible soundwave including the tokenized payment to an encrypted data payload including the tokenized payment information; and transmit the encrypted data payload including the tokenized payment information from the voice enabled device to a virtual assistant server. The virtual assistant server can be configured to: transmit the encrypted data payload including the tokenized payment information from the virtual assistant server to a merchant server. The merchant server can be configured to decrypt the encrypted data payload including the tokenized payment information at the merchant server.

In an embodiment, the voice enabled device can be configured to: convert the encrypted inaudible soundwave including the tokenized payment to an encrypted data payload including the tokenized payment information; and transmit the encrypted data payload including the tokenized payment information from the voice enabled device to a virtual assistant server. The virtual assistant server can be configured to transmit the encrypted data payload including the tokenized payment information from the virtual assistant server to a merchant server. The merchant server can be configured to transmit the encrypted data payload including the tokenized payment information from the merchant server to the payment processing system. The payment processing system can be configured to decrypt the data payload including the tokenized payment information at the payment processing system; and detokenize the tokenized payment information at the payment processing system.

In an embodiment the payment processing system can be configured to transmit the decrypted and detokenized payment information from a payment card network server of the payment processing system to an issuer server of the payment processing system.

In an embodiment the payment processing system can be configured to transmit a confirmation of the processed payment transaction from the payment processing system to a virtual assistant server. The virtual assistant server can be configured to transmit the confirmation from the virtual assistant server to the voice enabled device. The voice enabled device can be configured to transmit the confirmation to the user.

In an embodiment, the voice enabled device can be configured to convert the encrypted inaudible soundwave including the tokenized payment to an encrypted data payload including the tokenized payment information. The system can further comprise a virtual assistant server configured to transmit the encrypted data payload including the tokenized payment information to a merchant server. The system can also comprise a payment card network server of the payment processing system that can be configured to decrypt the encrypted data payload including the tokenized payment information. The payment card network server can also be configured to transmit the decrypted tokenized payment information to an issuer server of the payment processing system. The issuer sever can be configured to detokenize the tokenized payment information.

In an embodiment, the voice enabled device can be configured to encrypt a confirmation payload including an inaudible soundwave and emit the encrypted inaudible soundwave via a speaker to the user device.

DESCRIPTION OF THE EMBODIMENTS

Figures 1A, 1B:
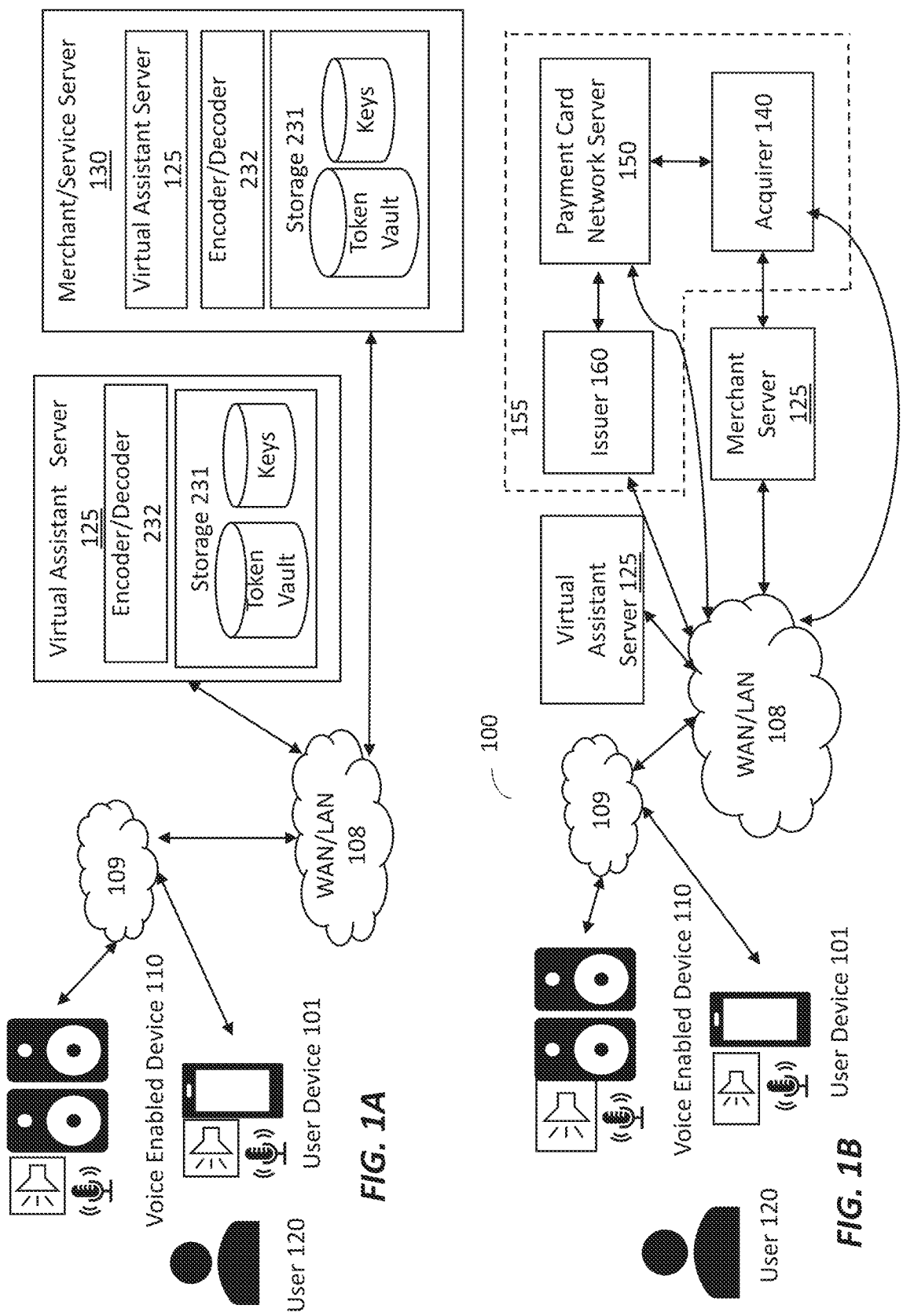
FIGS. 1A-1B shows embodiments of a system for securely authenticating users using a voice enabled device (VED).

Embodiments of the present disclosure are described more fully hereinafter with reference to the accompanying drawings, in which some, but not all, embodiments of the present disclosure are shown. Indeed, the present disclosure can be embodied in many different forms and should not be construed as limited to the embodiments set forth herein. Rather, these embodiments are provided so that this disclosure clearly satisfies applicable legal requirements.

As used herein, entities can include one or more persons, organizations, businesses, institutions and/or other entities, such as financial institutions, enterprises, service providers, and the like that implement one or more portions of one or more of the embodiments described and/or contemplated herein.

The steps and/or actions of a method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some embodiments, the processor and the storage medium can reside in an Application Specific Integrated Circuit (ASIC). In the alternative, the processor and the storage medium can reside as discrete components in a computing device. Additionally, in some embodiments, the events and/or actions of a method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage device, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc" as used herein, include compact disc (CD), laser disc, optical disc, digital versatile disc (DVD), floppy disk and blu-ray disc where disks usually reproduce data magnetically, while discs usually reproduce data optically with lasers. Combinations of the above are included within the scope of computer-readable media.

Computer program code for carrying out operations of embodiments of the present disclosure can be written in an object oriented, scripted or unscripted programming language such as Java, Perl, Ruby, Python, Smalltalk, C++, or the like. However, the computer program code for carrying out operations of embodiments of the present disclosure can also be written in conventional procedural programming languages, such as the "C" programming language or similar programming languages.

Embodiments of the present disclosure are described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer readable memory produce an article of manufacture including instruction means that implement the function/act specified in the flowchart and/or block diagram block(s).

The computer program instructions can also be loaded onto a computer or other programmable data processing apparatus to cause a series of operational steps to be performed on the computer or other programmable apparatus to produce a computer-implemented process so that the instructions that execute on the computer or other programmable apparatus provide steps for implementing the functions/acts specified in the flowchart and/or block diagram block(s). Alternatively, computer program implemented steps or acts can be combined with operator or human implemented steps or acts in order to carry out an embodiment of the present disclosure.

Referring to the drawings and, in particular, FIG. 1A, in an embodiment there is shown a system for securely authenticating users using a VED. As shown in FIG. 1A, the system comprises a user device 101, a VED 110, a virtual assistant server 125 and content, service or merchant server 130. A service, content or merchant server 130 as described herein includes any service, merchant, content provider or other enterprise or entity that employs secure user authorization and payload communications. In the exemplary embodiments described herein, a payment card network architecture is described. Other examples of authentication include secure login and user authentication for tokenized or other encrypted payloads for content, merchant or service providers, for example, streaming services, banking transactions, secure database access, social networking, and so on.

Figure 1C:
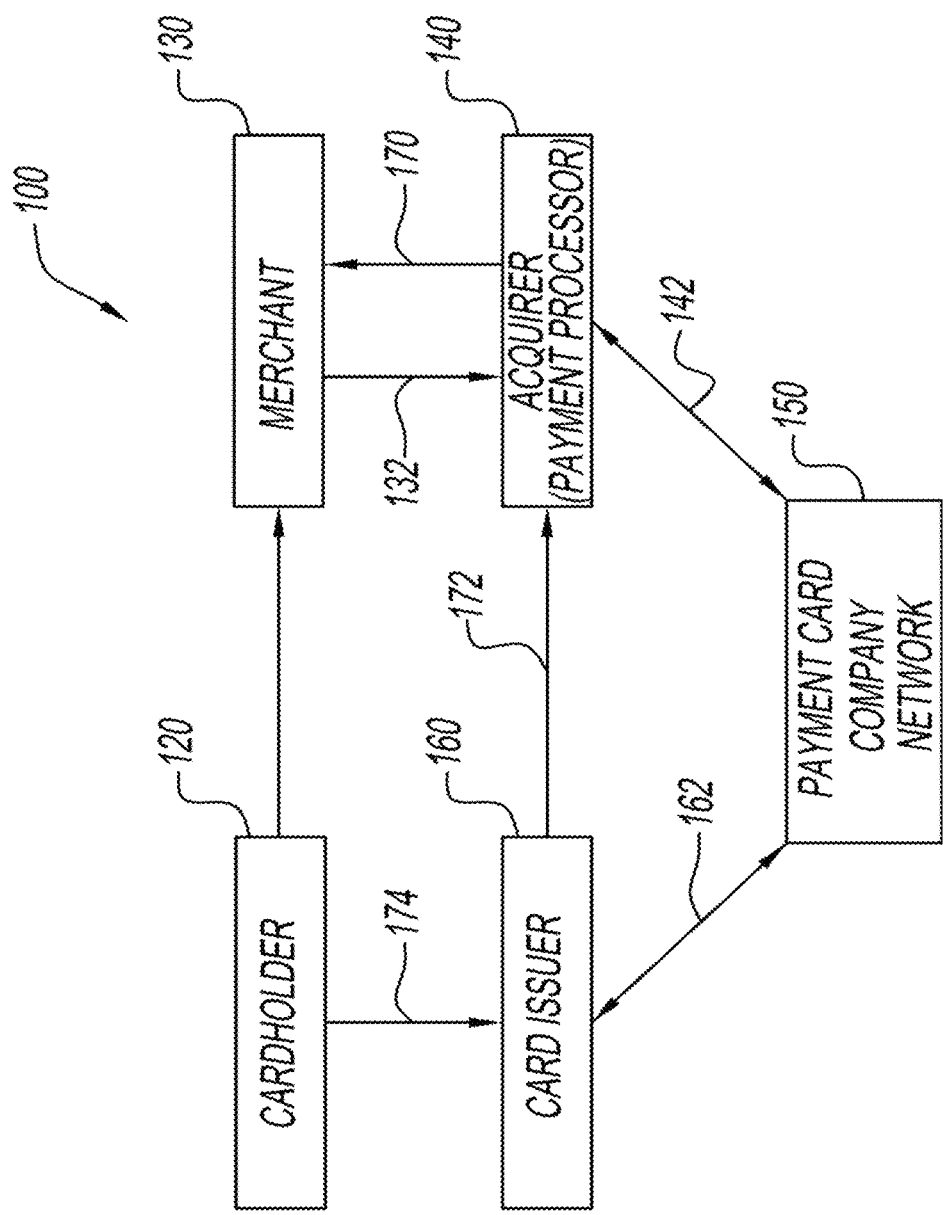
FIG. 1C is a diagram of a four party payment card system for securely authenticating users using a VED.
Figure 2:
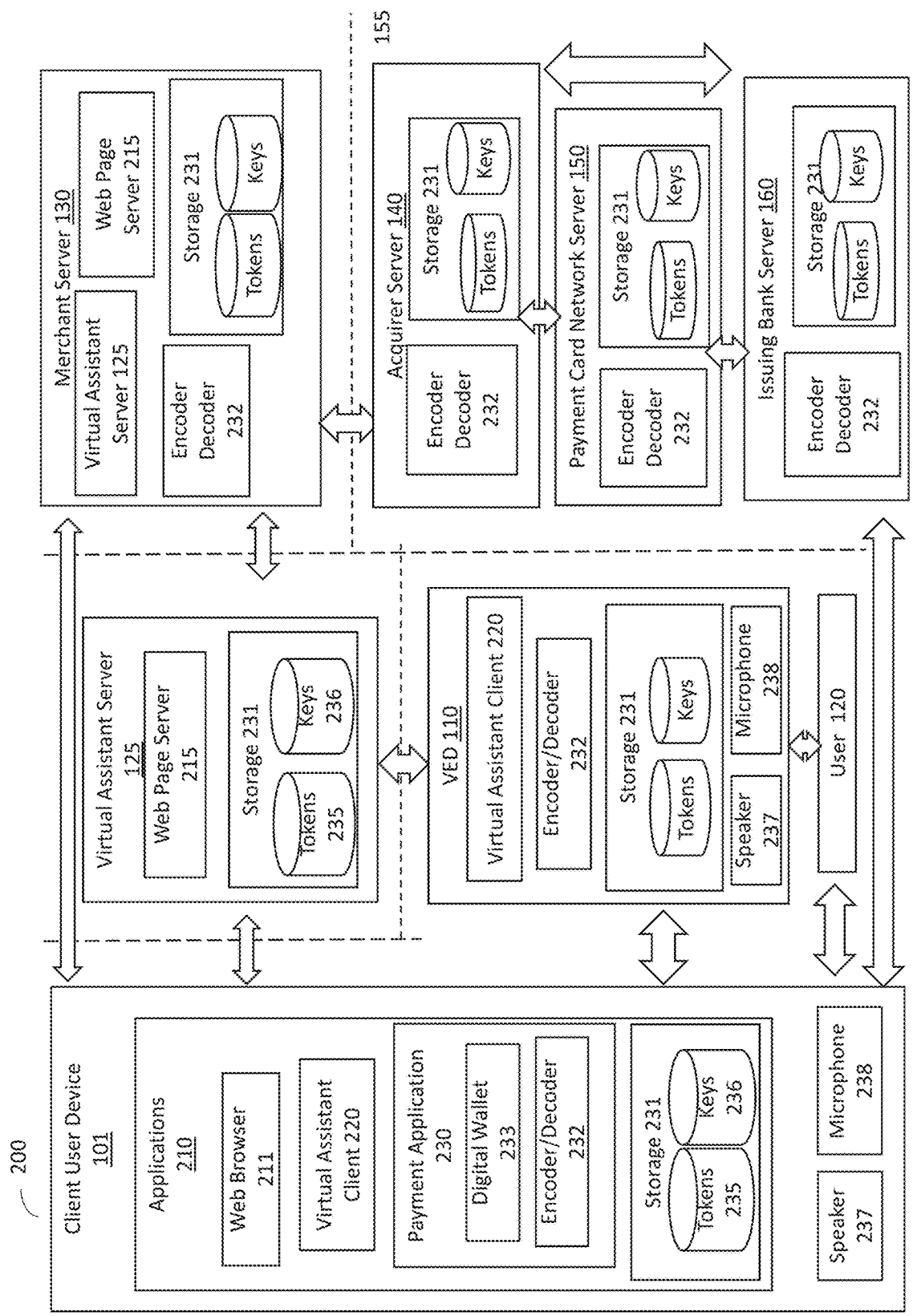
FIG. 2 is a logical architecture for securely authenticating users and payment card transactions using a VED.

Referring to the drawings and, in particular, FIGS. 1B-1C and FIG. 2, in an embodiment there is shown a four party payment (credit, debit or other) card system architecture generally represented by reference numeral 100. In card system 100, card holder user 120 submits the payment card to the merchant 130. A merchant's point of sale (POS) device communicates 132 with their acquiring bank or acquirer server 140, which acts as a payment processor.

A payment processing network includes an acquirer server 140, a payment card network server 150, and an issuer server 160, which communicate via a secure network path, for example, using secure payment card transaction databases and communications that are Payment Card Industry (PCI) Data Security Standard compliant. The acquirer server 140 initiates, at 142, the transaction on the payment card network server 150. The payment card network server 150 (that includes a financial transaction processing company) routes, via 162, the transaction to the issuing bank or card issuer server 160, which is identified using information in the transaction message. The card issuer server 160 approves or denies an authorization request, and then routes, via the payment card network server 150, an authorization response back to the acquirer server 140. The acquirer server 140 sends approval to the POS device of the merchant. Thereafter, seconds later, if the transaction is approved, the card holder completes the purchase and receives a receipt. The account of the merchant is credited, via 170, by the acquirer. The card issuer server 160 pays, via 172, the acquirer server 140. Eventually, the card holder 120 pays, via 174, the card issuer server 160.

In embodiments as described herein, a point of sale device can include or be extended to a user via virtual assistant servers and user devices configured to support payment card transactions executed via digital wallets 233, for example, Apple Pay™ or Google Wallet™. Accordingly, point of sale device as described herein includes electronic commerce transactions over a merchant website or payment card network commerce website configured to process payment card transactions for payment card holder user 120 transacting over the internet on a user device 101 and a VED 110.

Wireless network 109 is configured to couple user device 101 and VED 110 and its components with network 108. Wireless network 109 can include any of a variety of wireless sub-networks that can further overlay stand-alone ad-hoc networks, and the like, to provide an infrastructure-oriented connection for user device and VED computers. Such sub-networks can include mesh networks, Wireless LAN (WLAN) networks, cellular networks, and the like. In one embodiment, the system can include more than one wireless network.

Wireless network 109 can further include an autonomous system of terminals, gateways, routers, and the like connected by wireless radio links, and the like. These connectors can be configured to move freely and randomly and organize themselves arbitrarily, such that the topology of wireless network 108 can change rapidly.

Wireless network 109 can further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks can enable wide area coverage for mobile devices, such as client computers with various degrees of mobility. In one non-limiting example, wireless network 108 can enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 109 can include virtually any wireless communication mechanism by which information can travel between client computers and another computer, network, and the like.

Network 108 is configured to couple network computers with other computers and/or computing devices, including, virtual assistant server 125, service, content or merchant server 130, and payment processing system 155 servers through wireless network 108. Network 108 is enabled to employ any form of computer readable media for communicating information from one electronic device to another. Also, network 108 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks can utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links can further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 can be configured to transport information of an Internet Protocol (IP). In essence, network 108 includes any communication method by which information can travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

FIG. 2 illustrates a logical architecture of system 200 for secure payments using VEDs in accordance with at least one of the various embodiments.

A user device 101 having a display can have a series of applications or applets thereon including an applet or application program 210 (hereinafter an application or app) for use with the embodiment described herein. Applications 210 can include computer executable instructions, which can be loaded into mass memory and run on an operating system. Examples of application programs can include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 210 can also include website server 215, payment application 230, encoder/decoder 232, digital wallet 233, virtual assistant client 220, and web browser 211.

Applications 210 can be configured to can be hosted on host server computers. In at least one of the various embodiments, applications 210 or components of applications 210 can also be operative on virtual assistant server 125, merchant server 130, issuer server 160, acquirer server 140, VED 110 computer, or payment card network server 150. In any event, applications 210 can employ processes, or parts of processes, similar to those described in conjunction with FIGS. 3-7B, to perform at least some of its actions.

As shown in FIG. 2, in an embodiment, user device 101 includes a payment application 230 configured with a digital wallet 233. The payment application 230 can also be configured with an encoder/decoder 232. A voice enabled device (VED) 110 is also configured with an encoder/decoder 232.

An encoder/decoder 232 is configured for handling encrypted and/or tokenized payloads. An encoder is configured to provided cryptographic security, for example, symmetric single key encryption, asymmetric dual key encryption, hashing, and/or tokenization. For example, as described herein encoder/decoder is configured to access a token vault 235 for tokenized payload or key storage 236 for single key or dual key encryption. The encoder/decoder 232 is also configured to compress a payload into an inaudible soundwave and encrypt the compressed payload for transmission to a downstream device, as well as decrypt the same. Encryption can be performed using symmetric (single key), asymmetric (dual key), block cypher or stream cypher algorithms. DES, 3DES, AES, Blowfish, RC4, Twofish, Threefish, RC6, CAST, and IDEA are exemplary symmetric key cryptographic algorithms. Digital Signature Algorithm (DSA), Diffie Hellman, Rivest-Shamir-Adelman (RSA) and Elliptic Curve Cryptosystem (ECC) are exemplary asymmetric key algorithms. In an embodiment block cipher or symmetric key algorithms are employed for audio encryption.

User device 101 and VED each also comprise a speaker 237 and a microphone 238 for respectively receiving and emitting audio soundwaves, including inaudible soundwaves as described herein.

User device 101 can be used to access a website on the Internet, via a hardwired or Internet connected Wi-Fi hot spot (or by any telephone network, such as a 3G, 4G or 5G system, on which user device 101 communicates), by using payment application 230 or web browser 211.

Server computers can include virtually any network computer configured to provide content or services to users. Computers that can be arranged to operate as a payment card network server 150, acquirer server 140, issuer server 160, virtual assistant server 125 or a content or service server such as merchant server 130 include various network computers, including, but not limited to personal computers, desktop computers, multiprocessor systems, microprocessor-based or programmable consumer electronics, network PCs, server computers, network appliances, and the like. In embodiments described herein, server computers providing services or content are in environments requiring secure user authentication. For instance, exemplary embodiments of Payment Card Industry (PCI) Data Security Standard (PCI DSS) compliant payment card systems are described herein. PCI DSS compliant systems provide a baseline of technical and operational requirements designed to protect account data. PCI DSS applies to all entities involved in a payment card processing system—including merchants, payment processors, acquirers, issuers, and service providers. PCI DSS also applies to all other entities that store, process or transmit cardholder data (CHD) and/or sensitive authentication data (SAD).

In an embodiment, a virtual assistant server 125, merchant server 130, payment card network server 150, issuer server 160 and acquirer server 140 can also each be configured to include and encoder/decoder 232, a token vault 235, and key storage 236. Key storage 236 for encryption keys can include individual keys or enterprise keys for decrypting key encrypted authentication and/or payment information as described herein. In at least one of the various embodiments, a server, for example a merchant server 130 or virtual assistant server 125, can serve as a centralized server for holding a plurality of decryption keys for a plurality of users 120. Encoder/decoder 232 is also configured to perform encryption using algorithms as described herein.

In at least one of the various embodiments, a virtual assistant server 125 can be arranged to be in communication with payment card network server 150, issuer server 160, merchant server 130, or the like. Although virtual assistant server is shown as a separate server and entity, as also shown in FIG. 2, other entities can be configured to include a virtual assistant server 125, for example, merchant server 130.

A virtual assistant server 125 for a VED 110 can be implemented according to a client-server model. The virtual assistant client 220 can include a client-side portion executed on a VED 110 or user device 101 such as a smart phone, smart speaker, smart TV, or handheld computer and a server-side portion executed on a server system, for example on a virtual assistant server 125 host or merchant server 130. The client device (e.g. user device 101, VED 110) including the virtual assistant client 220 can communicate with a server system through one or more networks, which can include the Internet, an intranet, or any other wired or wireless public or private network.

For example, the client-side portion executed on the VED 110 or user device 101 can provide client-side functionalities, such as user-facing input and output processing and communications with server system. Server system can provide server-side functionalities for any number of clients residing on a respective user device.

Server systems can include one or more virtual assistant servers 125 that can include a client-facing I/O interface, one or more processing modules, data and model storage, and an I/O interface to external services. The client-facing I/O interface can facilitate the client-facing input and output processing for virtual assistant server 125. The one or more processing modules can utilize data and model storage to determine the user's intent based on natural language input and can perform task execution based on inferred user intent. Virtual assistant server 125 can include an external services I/O interface configured to communicate with external services, such as telephony services, calendar services, information services, messaging services, navigation services, and the like, through network(s) for task completion or information acquisition. The I/O interface to external services can facilitate such communications. Server systems can be implemented on one or more standalone data processing computers.

Although the functionality of the virtual assistant server 125 is described as including both a client-side virtual assistant client 220 and a server-side virtual assistant server 125, in some examples, the functions of an assistant (or speech recognition in general) can be implemented as a standalone application installed on user device 101 or VED 110. In addition, the division of functionalities between the client and server portions of the virtual assistant can vary in different examples.

In at least one embodiment, virtual assistant server 125 can be one or more computers arranged to comprise to include a web page server 215. The virtual assistant server 125 can be configured to manage clients and client applications such as those on the VED 110, user device 101, or the like. For example, virtual assistant server 125 can include one or more web page servers 215 providing web sites, including an online commercial portal, or the like. In at least one embodiment, virtual assistant server 125 can be arranged to integrate with payment card network server 150, issuer server 160, merchant server 130, and acquirer server 140.

In at least one embodiment, virtual assistant server 125, can include one or more third-party and/or external content provider services. Virtual assistant server 125 can include, integration with, for example, social network platforms, media distribution platforms, or the like. In at least embodiment, virtual assistant server 125 can be arranged to integrate and/or communicate with payment card network server 150, issuer server 160, merchant server 130, acquirer server 140, and client user devices 101 using API's or other communication interfaces provided by the services. For example, one content provider service can offer a HTTP/REST based interface.

In embodiments as described herein, virtual assistant server 125, merchant server 130, acquirer server 140 and/or payment card network server 150 can be provided with an encoder/decoder 232 configured for detokenization. As will be appreciated, tokenization and detokenization can be outsourced to other parties (e.g., on behalf of a merchant), and the servers described herein include such outsourced servers. Payment tokenization can be implemented in accord with techniques known in the art, for example as described in EMV® Payment Tokenization Specification—Technical Framework (v. 2.0 2019) and standards therefor. Detokenization includes a process of converting a payment token and token expiry date to an underlying personal identification number (PAN) and PAN expiry date based on the payment token/token expiry date mapping to the underlying PAN/PAN expiry date stored in a Token Vault 235. With Payment Tokenization, a cardholder's 120 PAN is substituted with a payment token that looks and functions like a PAN but is differentiated from a PAN by the underlying security of Token Domain Restriction Controls. These Token Domain Restriction Controls can include dynamic Token Cryptograms, POS Entry Mode and other parameters managed by a Registered Token Service Provider. With usage restricted to applicable Token Domains, payment tokens cannot be readily subject to the level of unauthorized or fraudulent use commonly associated with PANs.

One of ordinary skill in the art will appreciate that the architecture of systems as described herein are a non-limiting example that is illustrative of at least a portion of at least one of the various embodiments. As such, more or less components can be employed and/or arranged differently without departing from the scope of the innovations described herein. However, descriptions are sufficient for disclosing at least the innovations claimed herein.

The operation of certain aspects will now be described with respect to FIGS. 3A-7B. In at least one of various embodiments, processes 300, 400, 500, 600, and 700 described in conjunction with FIGS. 3A-7B, respectively, may be implemented by and/or executed on a one or more network computers. In other embodiments, these processes or portions of these processes may be implemented by and/or executed on a plurality of network computers, such as network computer. Likewise, in at least one of the various embodiments, processes 300, 400, 500, 600, and 700 or portions thereof, may be operative on one or more client computers, such as client computer. However, embodiments are not so limited, and various combinations of network computers, client computers, virtual machines, or the like may be utilized. Further, in at least one of the various embodiments, the processes described in conjunction with FIGS. 3A-7B can be operative in system with logical architectures such as those described in conjunction with FIGS. 1A-2.

Figure 3A:
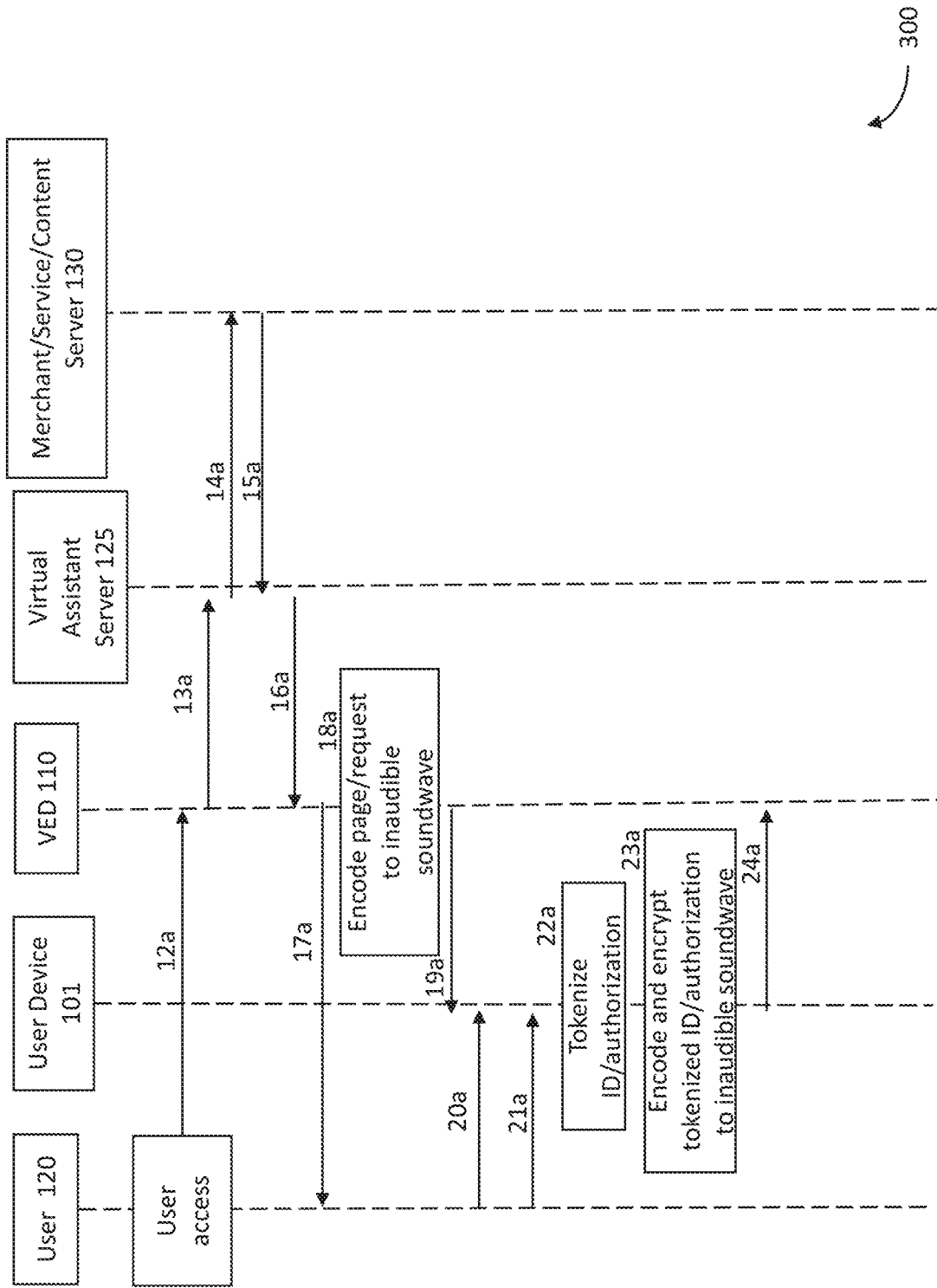
FIGS. 3A-3B illustrate an overview flowchart for process for secure user authorization via a VED in accord with at least one of the various embodiments.
Figure 3B:
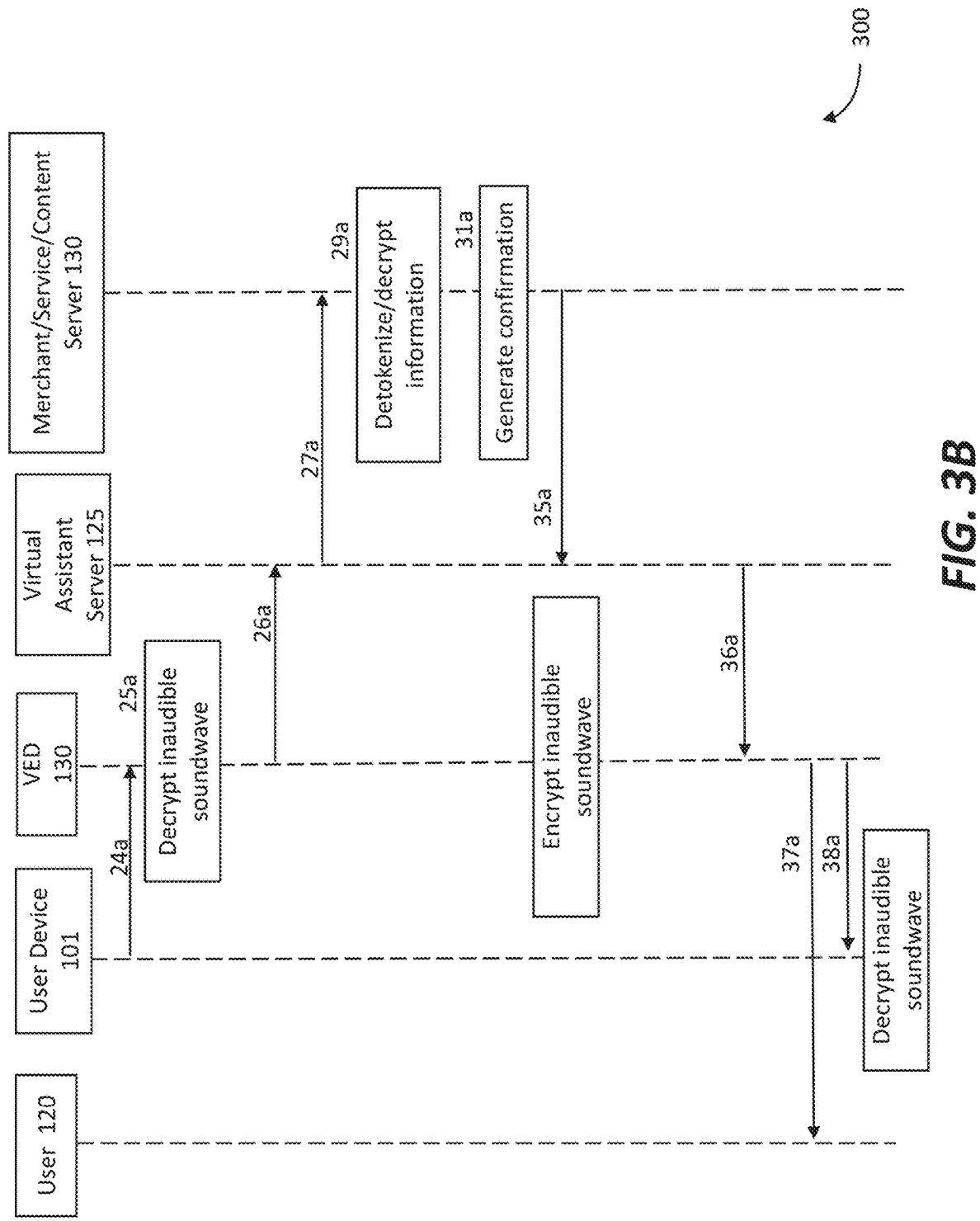

FIGS. 3A-3B illustrate an overview flowchart for process 300 for secure user authorization via a VED in accordance with at least one of the various embodiments. At block 12a, in at least one of the various embodiments, a user requests access for a service or content from a merchant website or content service portal via the VED. For a non-limiting example, the user makes login request for a streaming media service via a voice enabled device such as a smart speaker or smart TV (e.g.: "Computer, I'd like to login to Spotify account"). At block 13a, the VED transmits the voice command to a virtual assistant server 125 for processing into a request and user authorization for the service. At block 14a, the virtual assistant server 125 transmits the account access request to the requesting service, content, or merchant server 130.

At block 15a, the service or merchant server 130 transmits a user authorization request to the virtual assistant server 125. At block 16a, the virtual assistant server 125 processes the user authorization request into an audio request for the user and sends it to the VED 110. At block 17a, the VED 110 then outputs the request for authorization information to the user, for example a "please login now" or "please authorize" request, via speaker 237. The VED 110 then enters a listening state to await login and authentication information from the user. At block 18a, the VED decoder/encoder 232 can also encode a page into an inaudible soundwave to be transmitted from the VED 110. For example, the VED 110 can receive and encode a login page and send it to the user device 101, for instance on a dedicated application for the service or via the web browser. At block 19a, the VED speaker 237 transmits the page showing login request details to the user device 101 via the inaudible soundwave. The user device 101 receives the inaudible soundwave via the microphone 238 and the decodes the inaudible soundwave to display the page showing the login page via a web browser 211 or dedicated application on the user device.

At block 20a, the user enters inputs identity authentication information to the user device. For example, the user can input a passcode, PIN, a biometric identifier (e.g. thumbprint or facial recognition), or other security information on the user device 101. At block 21a, the user can also enter or confirm login information to the login page, via a web browser 211 or payment application 230 on the user device. At block 22a, the user device can tokenize, encrypt, hash or otherwise cryptographically secure the login at the user device. For example, in an embodiment, the user can either enter login details (e.g. username and password) or confirm the user device is authorized to push tokenized or encrypted credentials stored in a user's password keeper 233 to the VED 110. As will be appreciated, service or merchant servers can be configured with secure authorization using a number of protocols, for example, public and private key pair encryption, tokenization, or other forms of secure user identification.

At block 23a, the user device converts the tokenized or encrypted authorization information to an inaudible soundwave and encrypts the inaudible soundwave including the tokenized or encrypted authorization information at the user device. For example, the user device can be configured to encode the encrypted or tokenized information to a soundwave having a frequency inaudible to humans such as the ultrasonic range (i.e., about 20 kilohertz and above). The encoded inaudible soundwave can then itself be encrypted, for example with a key for a key pair. As will be appreciated, this results in a dual layer of security for the authorization information, as the identification information for the service can be itself encrypted or tokenized, and then the inaudible soundwave is again encrypted.

At block 24a, the user device transmits the encrypted inaudible soundwave including the tokenized or encrypted authorization information to the VED 110 via user device speaker 237 for downstream processing by the requesting content, service or merchant server 130.

In various embodiments, the system is configured to decrypt the encrypted inaudible soundwave, then decrypt or detokenize the authorization information. For example, in an embodiment, as shown in FIG. 3B, after block 24a, at block 25a the VED 110 receives the inaudible soundwave via VED microphone 238 decrypts the encrypted inaudible soundwave including the encrypted or tokenized authorization information. For example, the VED 110 can be provided with a key to decrypt the inaudible soundwave. At block 26a the VED transmits the decrypted tokenized or encrypted authorization information to the virtual assistant server, which in turn at block 27a transmits this information to the service or merchant server 130 for detokenization of the token or decryption and processing of the authorization information.

In the embodiment shown in FIG. 3B, at block 29a, the merchant server 130 or other service server detokenizes or decrypts the authorization information, for example using a decryption key from key storage 236 or a token from a token vault 235. In an embodiment, at block 31a, the service or merchant server 130 confirms the authorization, for example, by generating a confirmation message or page granting access to the account.

At block 35a the service or merchant server 130 transmits the confirmation message to the virtual assistant server 125 for processing and transmitting to the VED 110. In an embodiment, the confirmation and/or an access page can be compressed into an inaudible soundwave and encrypted at either the virtual assistant server 125 or the VED 110. At block 36a, the virtual assistant server 125 transmits the page to the VED 110. At block 37a the VED 110 outputs a confirmation message to the user via the speaker, for example, audio confirming the authorization is successful (e.g.: "Success" or the VED starts playing the accessed content, for example, streaming music). At block 38a, the VED can also send the confirmation to the user device 101, for example a page encoded to an inaudible soundwave and emitted by the VED speaker 237. The user device can then decrypt the inaudible soundwave and display the confirmation, for example, with a key.

Figure 4A:
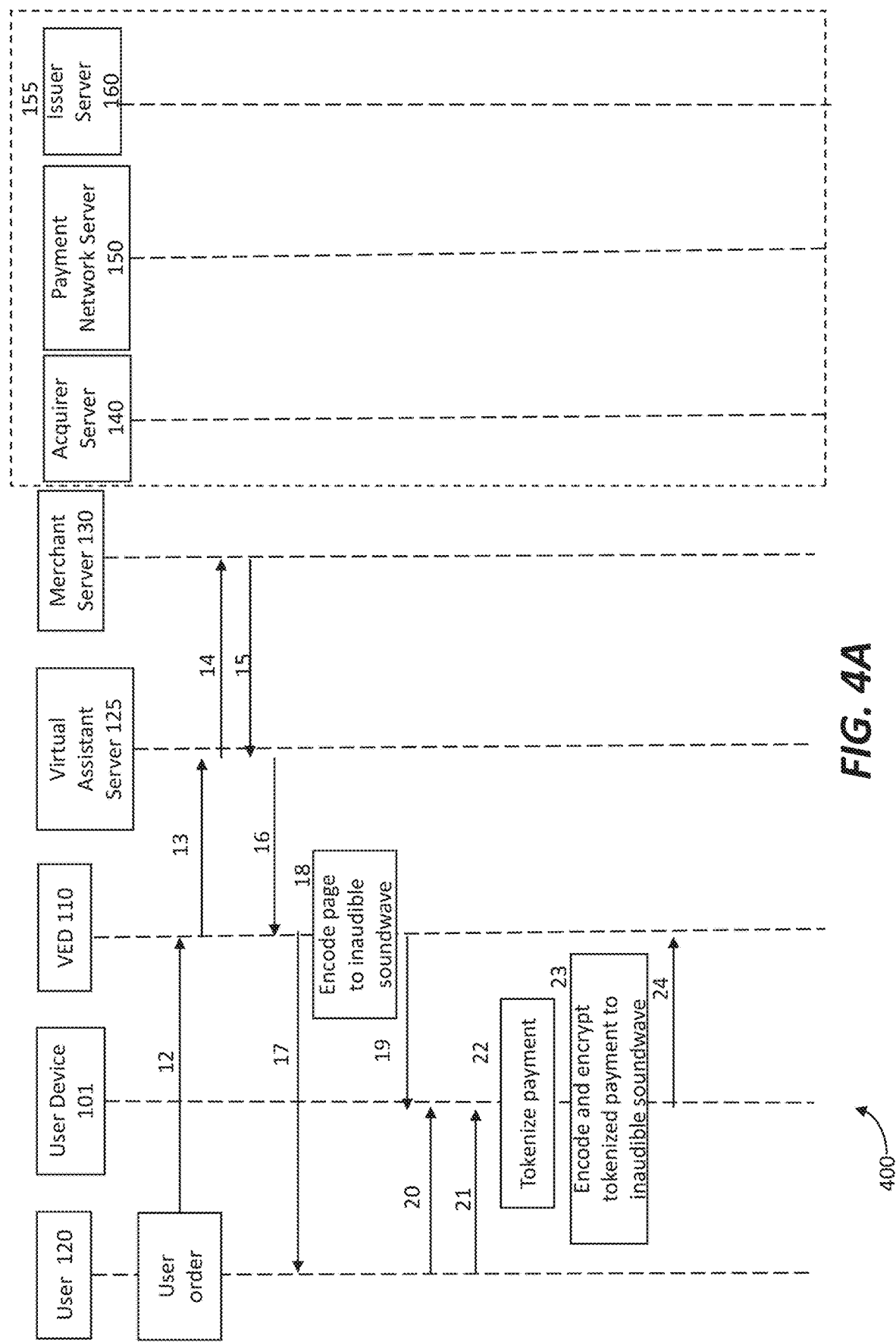
FIGS. 4A-4B illustrate an overview flowchart for process for secure payments and user authorization via a VED in accord with at least one of the various embodiments.
Figure 4B:
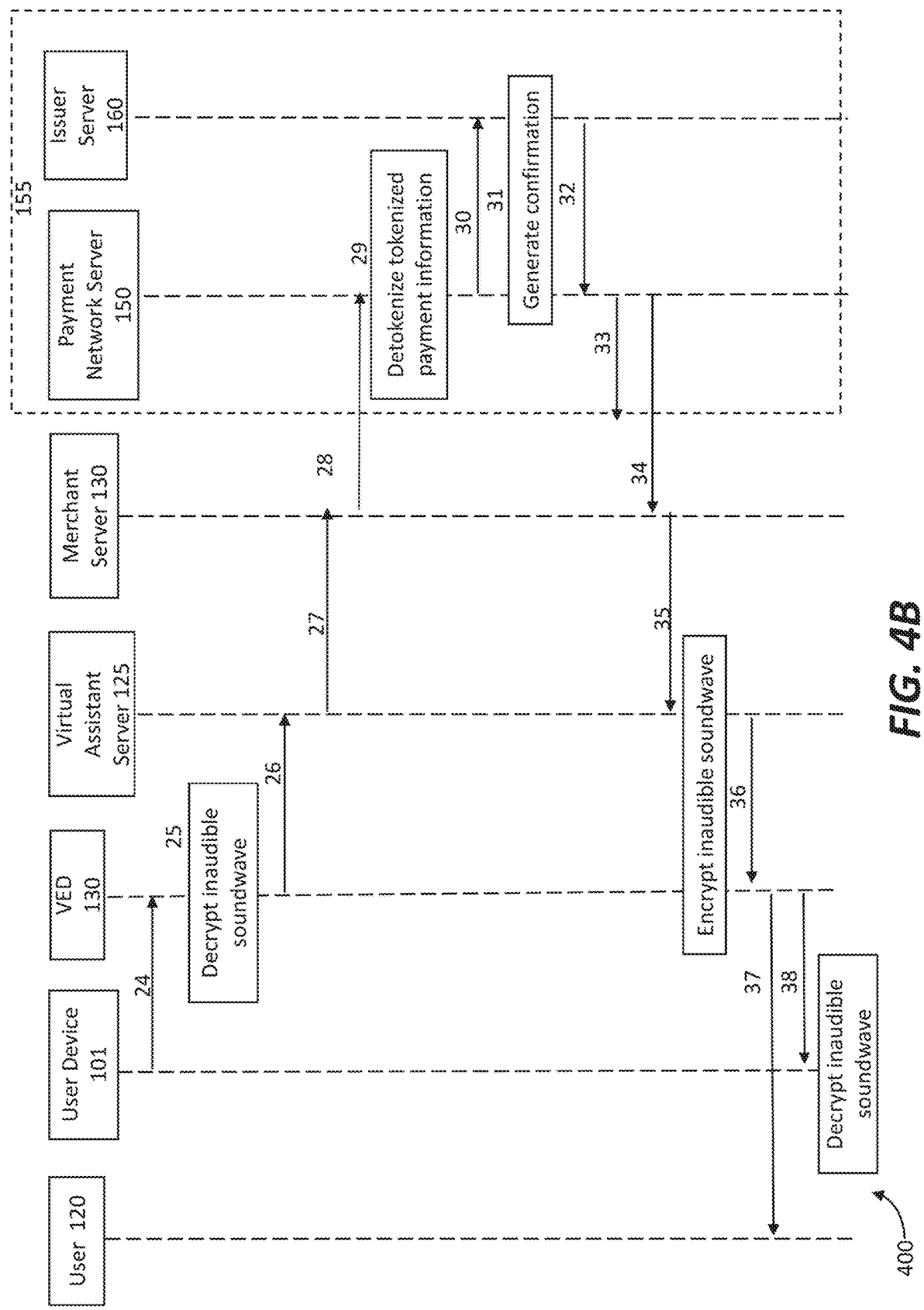

FIGS. 4A-4B illustrate an overview flowchart for process 400 for secure payments and user authorization via a VED in accordance with at least one of the various embodiments. At block 12, in at least one of the various embodiments, a user places order requiring a payment card transaction on a merchant website or ecommerce portal via a voice enabled device. For a non-limiting example, the user makes a food delivery purchase via a voice enabled device such as a smart speaker or smart TV (e.g.: "Computer, order a large cheese pizza from Angie's Pizza"). At block 13, the VED transmits the voice command to a virtual assistant server 125 for processing into an order for the merchant. At block 14, the virtual assistant server 125 transmits the order to the merchant server to place the order. At block 15, the merchant server 130 places the order and then transmits a request for payment to the virtual assistant server 125. At block 16, the virtual assistant server 125 processes the payment request into an audio request for the user. At block 17, the VED then outputs the request for payment information to the user, for example a "please pay now" request via speaker 237. The VED 110 then enters a listening state to await payment information and authentication information from the user. At block 18, the VED encoder/decoder 232 also encodes a page into an inaudible soundwave to be transmitted from the VED 110. For example, the VED can receive and encode a page (e.g. a bit.ly or other payment information page) showing the merchant and dollar amount for the transaction on the user device 101, for instance on the payment application or via the web browser. At block 19, the VED speaker 237 transmits the page showing payment details to the user device 101 via the inaudible soundwave. The user device 101 receives the inaudible soundwave via the microphone 238 and the decodes the inaudible soundwave to display the page showing the payment information via a web browser 211 or payment application 230 on the user device.

At block 20, the user enters inputs identity authentication information to the user device. For example, the user can input a passcode, PIN, a biometric identifier (e.g. thumbprint or facial recognition), or other security information on the user device 101. At block 21, the user also enters or confirms the payment information to the page showing payment details, for example the payment page, via a web browser 211 or payment application 230 on the user device. At block 22, the user device tokenizes the payment information with a token at the user device. For example, in an embodiment, the user can confirm the user device is authorized to push tokenized credentials stored in the user's digital wallet 233 to the VED.

At block 23, the user device converts the tokenized payment information to an inaudible soundwave and encrypts the inaudible soundwave including the tokenized payment information at the user device 101. The encoded inaudible soundwave can then be encrypted, for example with a key. Then, at block 24, the user device transmits the encrypted inaudible soundwave including the tokenized payment information to the VED via user device speaker 237 for downstream payment processing by a payment processing system.

In various embodiments, the system is configured to decrypt the encrypted inaudible soundwave, detokenize the tokenized payment information, and process the payment information at the payment processing system for a payment transaction. For example, in an embodiment, as shown in FIG. 4B, after block 24, at block 25 the VED receives the inaudible soundwave via VED microphone 238 decrypts the encrypted inaudible soundwave including the tokenized payment information. For example, the VED can be provided with a key to decrypt the inaudible soundwave. At block 26 the VED transmits the decrypted tokenized payment information to the virtual assistant server 125, which in turn at block 27 transmits the decrypted tokenized payment information to the merchant server 130. At block 28, the merchant server 130 transmits the decrypted tokenized payment information to the payment processing system 155 for detokenization of the token and processing of the payment. As shown in FIGS. 4A-7B, for purposes of brevity, acquirer server 140 is not shown. However as will be appreciated, acquirer server can be configured to perform the processes shown and described for payment card network server 150 of the payment processing system 155.

In the embodiment shown in FIG. 4B, at block 29, a payment card network server of the payment processing system can detokenize the tokenized payment information. Then at block 30, the payment card network server transmits the fully decrypted and detokenized payment information to an issuer server of the payment processing system.

At block 31, the issuer server 160 confirms receipt of the payment and generates a payment confirmation. At block 33 the issuer server 160 transmits a confirmation message the payment network server, which in turn relays the payment confirmation message to the merchant server at block 34. At block 35, the merchant server relays the confirmation message to the virtual assistant server for processing and transmitting to the VED. In an embodiment, the payment confirmation can be compressed into an inaudible soundwave and encrypted at either the virtual assistant server 125 or the VED 110. At block 36, the virtual assistant server transmits the payment confirmation to the VED 110. At block 37 the VED outputs a payment confirmation message to the user, for example, and audio message confirming the payment confirmation (e.g.: "Payment confirmed. Your pizza will arrive in 30 minutes or less, or its on Angie!"). At block 38, the VED can also send the payment confirmation to the user device, for example a bit.ly page encoded to an inaudible soundwave, which is emitted via the VED speaker 237. The user device can then detect the inaudible soundwave via microphone 238 and decrypt the inaudible soundwave and display the confirmation, for example, with a key stored in key storage 236.

Figure 5:
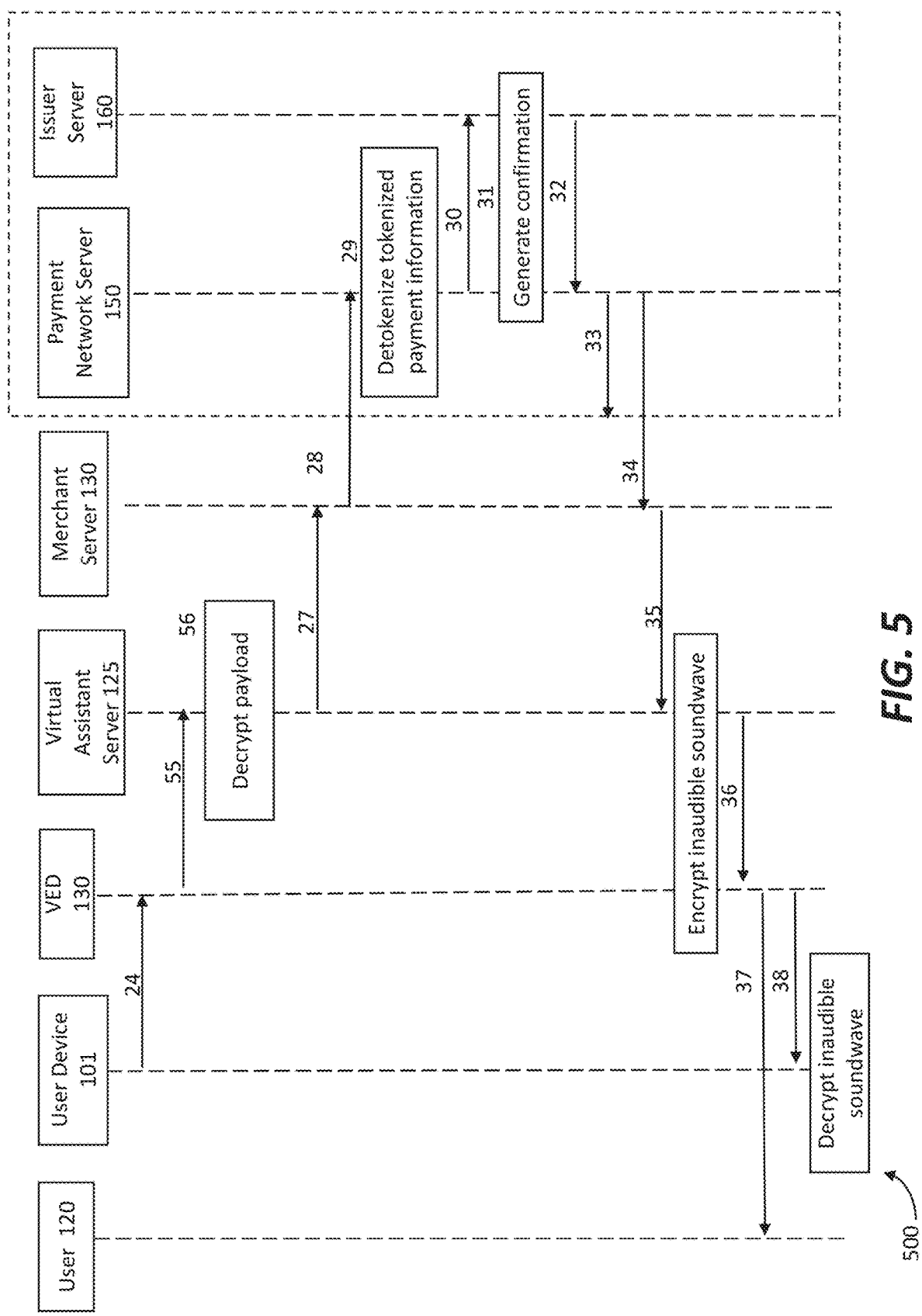
FIG. 5 illustrates an overview flowchart for process for secure payments and user authorization via a VED in accord with at least one of the various embodiments.

In another embodiment, the virtual assistant server 125 can be configured to decrypt a data payload having the tokenized payment information. For example, in an embodiment, as shown in FIG. 5, after block 24, at block 55 the VED 110 receives the encrypted inaudible soundwave, then converts the encrypted inaudible soundwave to an encrypted data payload including the tokenized payment information and transmits the encrypted data payload including tokenized payment information to the virtual assistant server 125. At block 56, the virtual assistant server 12132 then decrypts the encrypted data payload including the tokenized payment information. For example, the virtual assistant server can be provided with a key stored in key storage 236 to decrypt the data payload. Then at block 27, the virtual assistant server transmits the decrypted tokenized payment information to the merchant server, where the process continues in the same manner as also shown in FIG. 4B.

Figure 6:
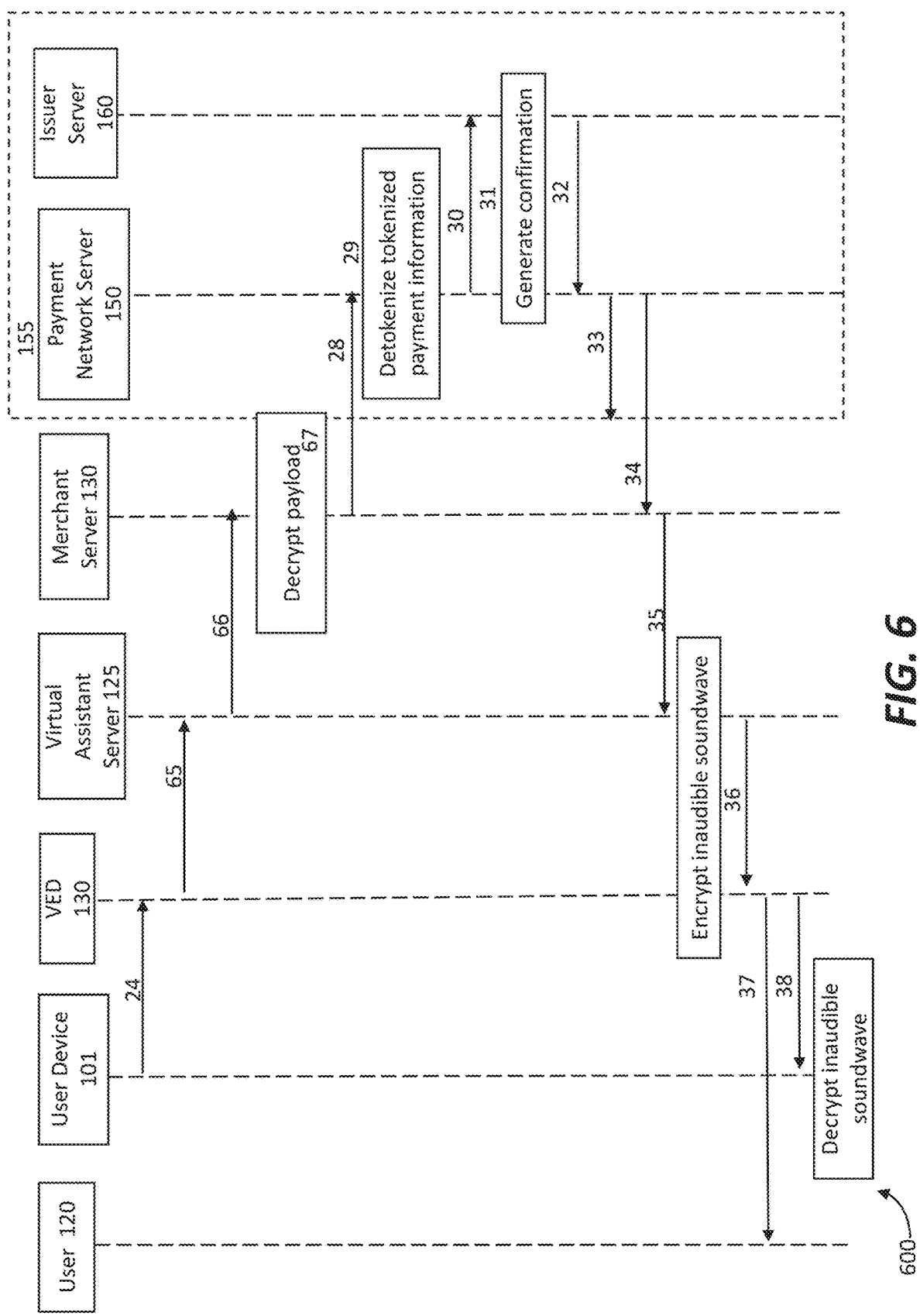
FIG. 6 illustrates an overview flowchart for process for secure payments and user authorization via a VED in accord with at least one of the various embodiments.

In another embodiment, the merchant server can be configured to decrypt an encrypted data payload including the tokenized payment information. For example, in an embodiment, as shown in FIG. 6, after block 24, at block 65 the VED receives the inaudible soundwave, then converts the inaudible soundwave to an encrypted data payload including the tokenized payment information and transmits the encrypted data payload including tokenized payment information to the virtual assistant server 125. Then at block 66, the virtual assistant server transmits the encrypted data payload including the tokenized payment information to the merchant server. At block 67, the merchant server then decrypts the encrypted data payload including the tokenized payment information, for example with a key from key storage 231. At block 28, the merchant server transmits the decrypted tokenized payment information to the payment processing system for decryption of the token and processing of the payment in the same manner as also shown in FIGS. 4B-5.

Figure 7A:
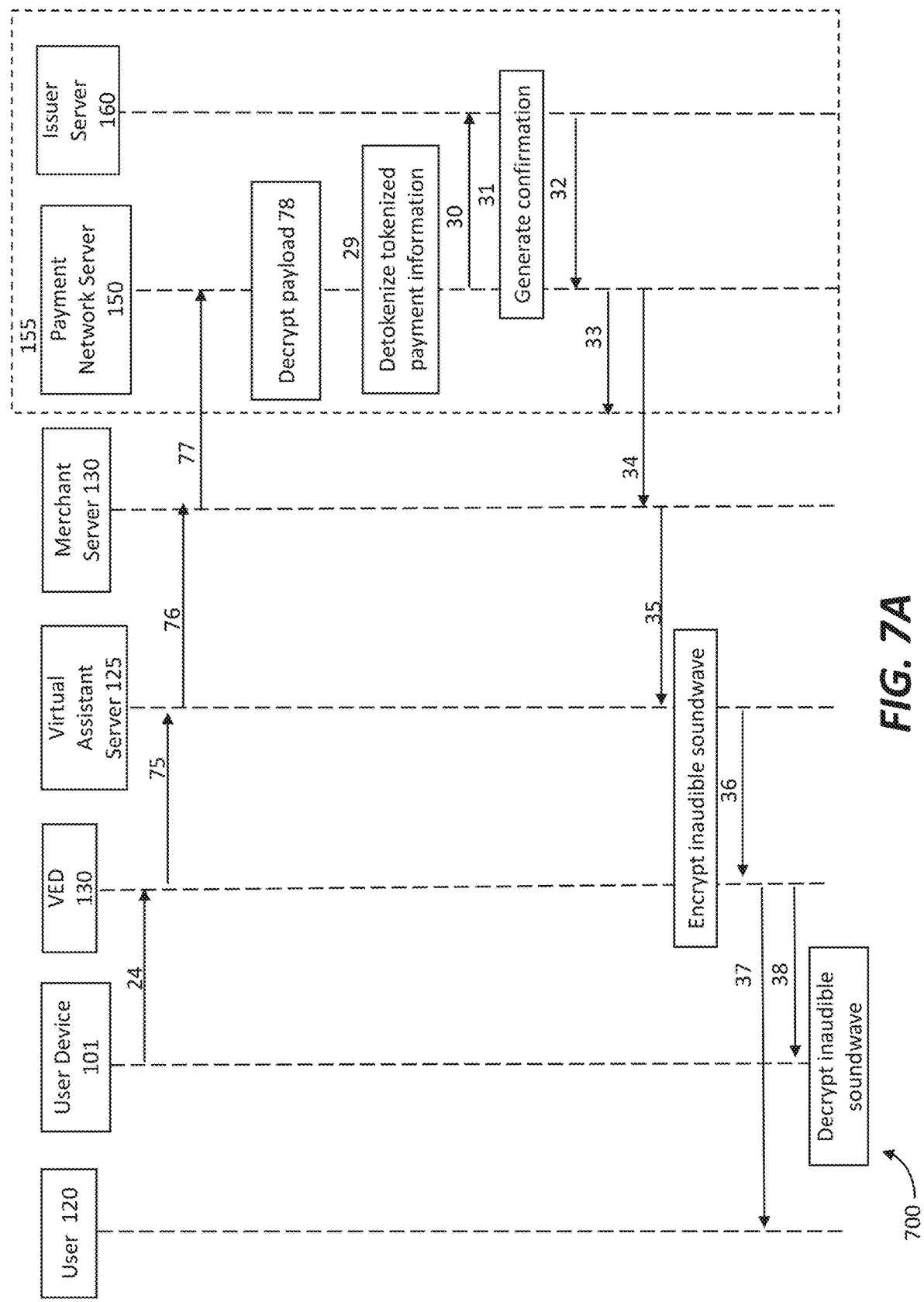
FIGS. 7A-7B illustrate an overview flowchart for process for secure payments and user authorization via a VED in accord with at least one of the various embodiments.
Figure 7B:
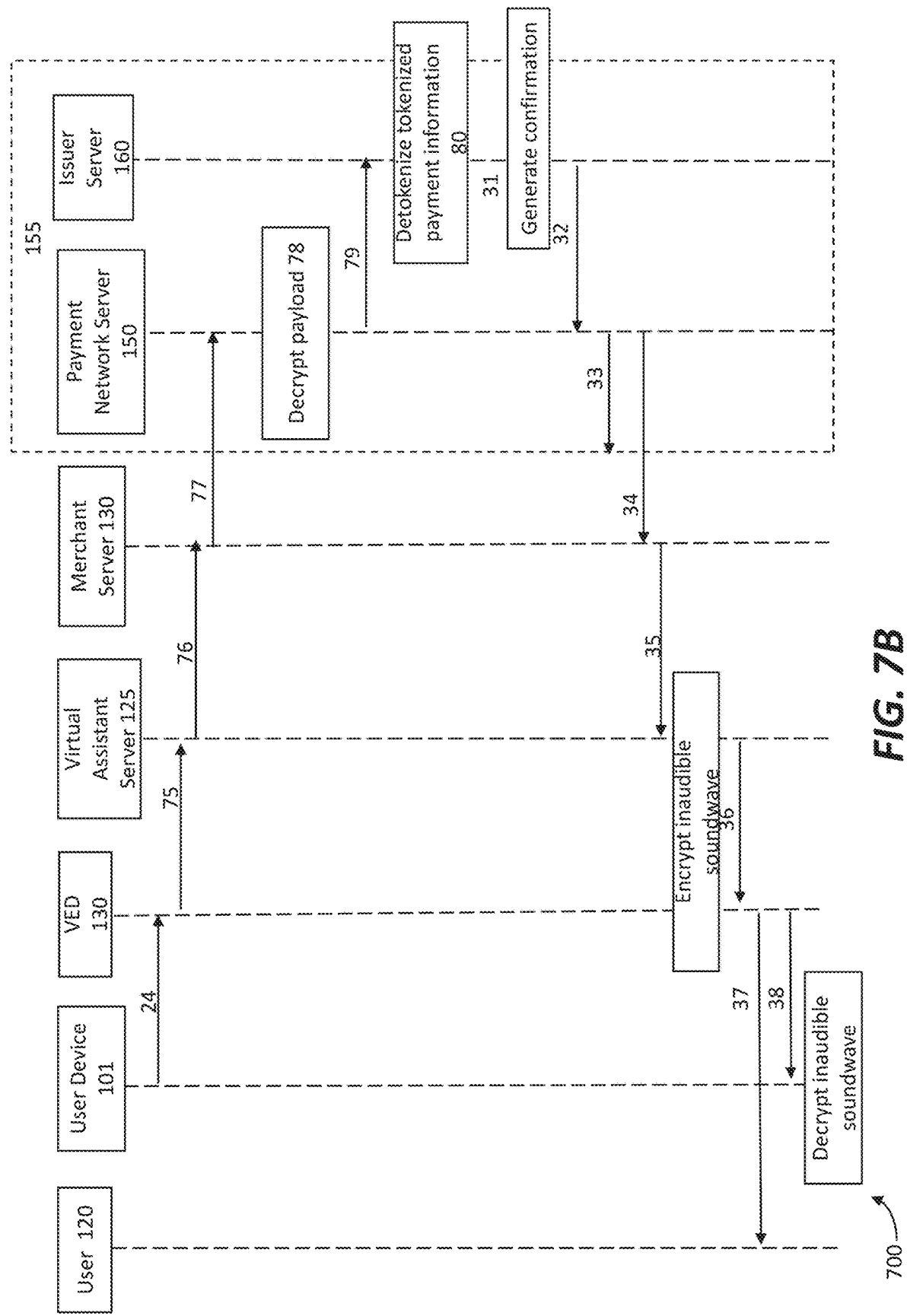

In another embodiment, the payment processing system can be configured to decrypt a data payload encrypted including the tokenized payment information and detokenize the tokenized payment information. For example, in an embodiment, as shown in FIGS. 7A-7B, after block 24, at block 75 the VED 110 receives the inaudible soundwave, then converts the inaudible soundwave to an encrypted data payload including the tokenized payment information and transmits the encrypted data payload including the tokenized payment information to the virtual assistant server 125. Then at block 76, the virtual assistant server transmits the encrypted data payload including the tokenized payment information to the merchant server. At block 67, the merchant server transmits the encrypted data payload including the tokenized payment information to the payment processing system. The merchant server then outputs the encrypted data payload including the tokenized payment information to the payment card network server 150 of the payment processing system. At block 78 the payment card network server 150 then decrypts the encrypted data payload including the tokenized payment information.

In an embodiment, as shown in FIG. 7A, at block 29, the payment card network server of the payment processing system for detokenizes the tokenized payment information and continues to process the payment thereafter in the same manner as also shown in FIGS. 4B-6. In another embodiment, as shown in FIG. 7B, at block 79 the payment card network server 150 of the payment processing system transmits the decrypted tokenized payment information to the issuer server 160 of the payment processing system. At block 80, the issuer server 160 detokenizes the tokenized payment information and continues to process the payment thereafter in the same manner as also shown in FIGS. 4B-6.

It will be understood that each block of the flowchart illustration, and combinations of blocks in the flowchart illustration, can be implemented by computer program instructions. These program instructions can be provided to a processor to produce a machine, such that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks. The computer program instructions can also cause at least some of the operational steps shown in the blocks of the flowchart to be performed in parallel. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

The terms "comprises" or "comprising" are to be interpreted as specifying the presence of the stated features, integers, steps or components, but not precluding the presence of one or more other features, integers, steps or components or groups thereof.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it can be based on one or more other things as well. In other words, unless expressly indicated otherwise, as used herein "based on" means "based at least in part on" or "based at least partially on."

The techniques described herein are exemplary and should not be construed as implying any particular limitation on the present disclosure. It should be understood that various alternatives, combinations and modifications could be devised by those skilled in the art from the present disclosure. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A system comprising:
a payment card processing system comprising a processor for processing a payment card transaction; and
a voice enabled device comprising a processor and operatively connected to a voice assistant server;
the voice enabled device being configured to at least:
output a request for payment information;
enter a listening state;
transmit a page showing payment details to the user device via an inaudible soundwave from the voice enabled device;
detect and obtain, via a microphone, an encrypted inaudible soundwave including a tokenized payment information emitted from a speaker of the user device; and
decrypt the encrypted inaudible soundwave including the tokenized payment or convert the encrypted inaudible soundwave including the tokenized payment to an encrypted data payload including the tokenized payment information; and
the payment card processing system being configured to at least:
detokenize the tokenized payment information; and
process the payment information at the payment processing system for a payment transaction.

2. The system of claim 1 further comprising:
the voice enabled device being configured to:
convert the encrypted inaudible soundwave including the tokenized payment to an encrypted data payload including the tokenized payment information; and
transmit the encrypted data payload including the tokenized payment information from the voice enabled device to a virtual assistant server; and
the virtual assistant server being configured to decrypt the encrypted data payload including the tokenized payment information at the virtual assistant server.

3. The system of claim 1, further comprising:
the voice enabled device being configured to:
convert the encrypted inaudible soundwave including the tokenized payment to an encrypted data payload including the tokenized payment information; and
transmit the encrypted data payload including the tokenized payment information from the voice enabled device to a virtual assistant server;
the virtual assistant server being configured to:
transmit the encrypted data payload including the tokenized payment information from the virtual assistant server to a merchant server; and
the merchant server being configured to decrypt the encrypted data payload including the tokenized payment information at the merchant server.

4. The system of claim 1, further comprising:
the voice enabled device being configured to
convert the encrypted inaudible soundwave including the tokenized payment to an encrypted data payload including the tokenized payment information; and
transmit the encrypted data payload including the tokenized payment information from the voice enabled device to a virtual assistant server;
the virtual assistant server being configured to transmit the encrypted data payload including the tokenized payment information from the virtual assistant server to a merchant server;
the merchant server being configured to transmit the encrypted data payload including the tokenized payment information from the merchant server to the payment processing system; and
the payment processing system being configured to
decrypt the data payload including the tokenized payment information at the payment processing system; and
detokenize the tokenized payment information at the payment processing system.

5. The system of claim 1, the payment processing system being configured to transmit the decrypted and detokenized payment information from a payment card network server of the payment processing system to an issuer server of the payment processing system.

6. The system of claim 1, further comprising:
the payment processing system being configured to transmit a confirmation of the processed payment transaction from the payment processing system to a virtual assistant server
the virtual assistant server is configured to transmit the confirmation from the virtual assistant server to the voice enabled device; and
the voice enabled device being configured to transmit the confirmation to the user.

7. The system of claim 1, further comprising:
the voice enabled device being configured to convert the encrypted inaudible soundwave including the tokenized payment to an encrypted data payload including the tokenized payment information;
a virtual assistant server configured to transmit the encrypted data payload including the tokenized payment information to a merchant server;
a payment card network server of the payment processing system configured to decrypt the encrypted data payload including the tokenized payment information, the payment card network server being configured to transmit the decrypted tokenized payment information to an issuer server of the payment processing system; and
the issuer server being configured to detokenize the tokenized payment information.

8. The system of claim 1, the voice enabled device being configured to:
encrypt a confirmation payload including an inaudible soundwave; and emit the encrypted inaudible soundwave via a speaker to the user device.

\* \* \* \* \*